June 11, 1940.  F. E. ARM  2,204,392
HOSE AND PIPE COUPLER
Filed Feb. 25, 1938
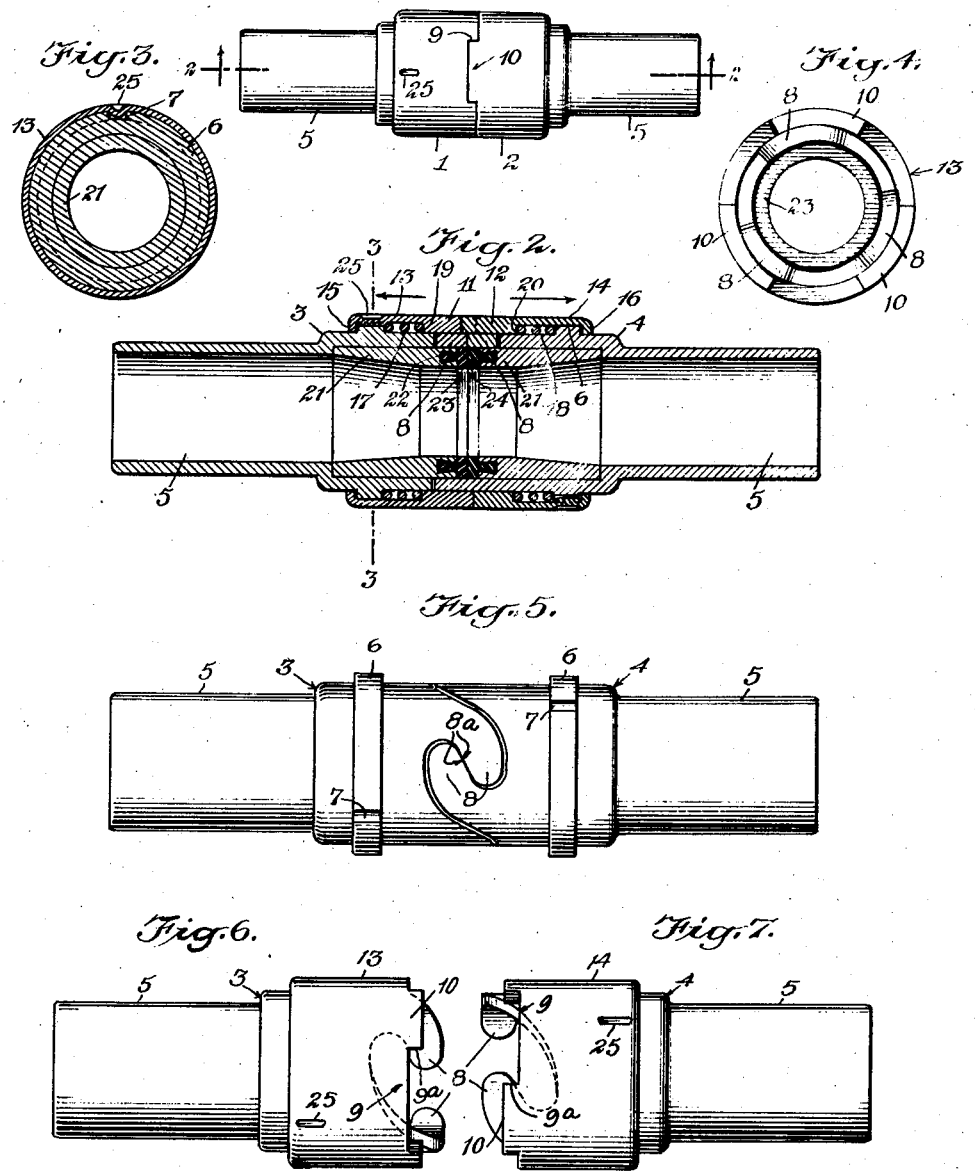
WITNESSES
INVENTOR
Frederick E. Arm
BY
ATTORNEYS Patented June 11, 1940

2,204,392

UNITED STATES PATENT OFFICE 2,204,392

HOSE AND PIPE COUPLER

Frederick E. Arm, Brooklyn, N. Y., assignor of one-half to Mary Mastowski, New York, N. Y.

Application February 25, 1938, Serial No. 192,573

1 Claim. (Cl. 285—178)

This invention relates to an improved hose and pipe coupler, an object being to provide a construction which will present a smooth and neat appearance with no protruding portions to be injured or get out of order.

Another object of the invention is to provide an improved hose and pipe coupler wherein the movable parts are moved directly toward and from each other when coupling or uncoupling.

A further object of the invention is to provide an improved coupler for hose and pipe wherein the interlocking coupling structures are completely covered.

In the accompanying drawing—

Fig. 1 is a side view of a coupler disclosing an embodiment of the invention;

Fig. 2 is a sectional view through Fig. 1 approximately on the line 2—2, the same being on an enlarged scale;

Fig. 3 is a transverse sectional view through Fig. 2 approximately on the line 3—3;

Fig. 4 is an end view of one of the coupling members shown in Fig. 2;

Fig. 5 is an elevation of the coupler with the outside covering and locking members removed;

Fig. 6 is a side elevation of the left-hand part of the structure shown in Fig. 1 with the locking sleeve pulled back;

Fig. 7 is a side elevation of the right-hand portion of the structure shown in Fig. 1 with the locking sleeve pulled back.

Referring to the accompanying drawing by numerals, 1 and 2 indicate sliding members which are also locking members to lock the coupler against becoming undone. These members are slidably mounted on coupling members 3 and 4. Each of these coupling members is provided with a tubular extension or shank 5 to which a hose or pipe may be connected; for instance, if the coupler were used on a fire hose, shank 5 of coupling member 3 would be secured to one end of the hose and shank 5 of coupling member 4 would be secured to the opposite end. As these coupling members 3 and 4 are exactly alike either of the members may be used at either end of a hose and, consequently, either end of the hose may be coupled with either end of an adjacent hose. As shown particularly in Figs. 2 and 5, the coupling 4 is provided with stop means, for example an upstanding annular ring 6 having a notch or groove 7; also the coupling 4 is provided with hook-shaped coupling members 8. Shown in the accompanying drawing there are only two hook-shaped coupling members 8 for the coupling 4 and also two similarly shaped members for the coupling 3. These coupling members or hooks as they conveniently are called, have rounded terminals (Fig. 5) and contiguous cam surfaces 8a. When the parts are arranged as shown in Fig. 5, the coupling members are interlocked or coupled. If a longitudinal pull were made thereon they would quickly separate and during the separation they would rotate somewhat. To prevent this rotation and separation except when desired, the locking members 1 and 2 are used.

Each of the locking members 1 and 2 is provided with three notches 9 and three substantially rectangular lugs 10. Said lugs have leading heels 9a (Figs. 6 and 7) which are held in set-back positions in respect to the rounded hook terminals by the interengagement of the grooves 7 and depressions 25 respectively, in the rings 6 and the locking members 1, 2. When the two locking members are together, as shown in Fig. 1, the lugs 10 of locking member 2 will fit into the notches 9 of locking member 1. From Fig. 2 it will be observed that these locking members are provided with thickened portions 11 and 12 defining shoulders and thin portions 13 and 14. The thin portions are bent over at 15 and 16 to engage the rings 6 thus providing interengaging means for limiting relative axial movement. Springs 17 and 18 are arranged between the respective rings 6 and the respective shoulders 19 and 20. These springs are tensioned to tend to hold the parts in the position shown in Figs. 1 and 2 but may be pulled to the position shown in Fig. 7. But in connecting the coupling the rounded terminals of the hooks 8 are put together, and readily so, because of their exposure for initial engagement, whereupon the tubular members are turned in opposite directions. The lugs 10 which ride upon each other at this time, force the retreat of the locking members 1, 2, because of the ensuing cam action of the surfaces 8a (Fig. 5), a non-turning interlock being established by the eventual snapping of the lugs 10 into the notches 9 (Fig. 1). When in the position shown in Fig. 1 a longitudinal pull on the shanks cannot separate the couplings; also a rotary movement of locking members 1 and 2 cannot separate the couplings, but only a longitudinal movement accompanying a grasping of the locking members 1, 2.

As shown in Fig. 2, there is provided a sleeve 21 in each of the coupling members 3 and 4. These sleeves are preferably countersunk somewhat in the coupling members and are provided with annular grooves 22 for receiving the respective washers or gaskets 23 and 24. These gaskets may be rubber, fiber, or other material and are pressed tightly together upon the occurrence of the foregoing cam action of the cam surfaces 8a for pulling the parts together so as to press washer 23 tightly against washer 24.

It will be understood that the locking members 1 and 2 cannot become interlocked as shown in Fig. 1, until the hook members 8 have been completely interlocked and the washers tightly pressed together. After the parts have been coupled, as shown in Fig. 1, rotary movement of any part will not affect the coupler, and also there are no objectionable protruding pins or other parts which may be injured in case the coupler were roughly handled. It will also be observed that the interengagement of each depression 25 with the respective groove 7 in the ring 6 provides for a proper sliding or reciprocating movement of locking members 1 and 2 but not to permit a rotary movement thereof.

I claim:

A coupler for a pair of tubular members consisting of matching hooks and recesses, said hooks including rounded terminals and contiguous cam surfaces, a spring on each of the tubular members, a locking member encasing each of the springs and including a shouldered end, interengaging means on said tubular members and said locking members for limiting relative axial movement, so that the confronting edges of the shouldered ends are stopped short of the rounded terminals, means to prevent relative rotation between said locking members and said tubular members, and interengageable lugs and notches on said confronting edges of said locking members, including leading heels held in setback positions in respect to said rounded terminals to expose said terminals for initial engagement whereat the lugs are abutted preparatory to a mutual cam action of said surfaces upon oppositely turning the tubular members, the lugs riding upon each other forcing retreat of said locking members by said cam action and eventually snapping into the notches to establish a non-turning interlock.

FREDERICK E. ARM.